United States Patent
Nyshadham (10) Patent No.: US 10,171,519 B2
(45) Date of Patent: Jan. 1, 2019

(54) SESSION TRANSFER PROTOCOL BETWEEN DIFFERENT BROWSERS ON DIFFERENT DEVICES

(71) Applicant: Verizon Patent and Licensing Inc., Arlington, VA (US)

(72) Inventor: Shiva Rama Krishna Nyshadham, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 260 days.

(21) Appl. No.: 14/516,152

(22) Filed: Oct. 16, 2014

(65) Prior Publication Data
US 2016/0112464 A1    Apr. 21, 2016

(51) Int. Cl.
H04L 29/06    (2006.01)

(52) U.S. Cl.
CPC ...... H04L 65/1069 (2013.01); H04L 65/1083 (2013.01)

(58) Field of Classification Search
CPC .................. H04L 65/1069; H04L 65/1083
USPC ......................................................... 709/227
See application file for complete search history.

(56) References Cited

U.S. PATENT DOCUMENTS

| | | | | |
|---|---|---|---|---|
| 7,042,879 B2 * | 5/2006 | Eschbach | ............ | H04L 63/0428 370/392 |
| 8,316,460 B1 * | 11/2012 | Wang | ................. | H04L 63/0428 713/165 |
| 8,464,350 B2 * | 6/2013 | Kanevsky | ......... | G06F 17/30899 726/26 |
| 8,972,517 B2 * | 3/2015 | Black | ..................... | H04L 67/06 709/214 |
| 9,418,243 B2 * | 8/2016 | Bauer | ................. | G06F 21/6263 |
| 2005/0138128 A1 * | 6/2005 | Baniel | ..................... | H04L 29/06 709/206 |
| 2009/0191868 A1 * | 7/2009 | Siegel | ................. | H04L 65/1016 455/435.1 |
| 2014/0351370 A1 * | 11/2014 | Ashley | ................. | H04L 67/148 709/217 |

OTHER PUBLICATIONS

Wikipedia, "Firefox Sync", http://en.wikipedia.org/wiki/Firefox_Sync, May 11, 2014, 3 pages.
Wikipedia, "Google Chrome", http://en.wikipedia.org/wiki/Google_Chrome, Sep. 11, 2014, 37 pages.

* cited by examiner

*Primary Examiner* — Jason D Recek
*Assistant Examiner* — Nazia Naoreen (57) ABSTRACT

A device may be configured to establish a session for communicating data between a first user device and a server device. The device may monitor the data communicated via the session. The device may store session information based on monitoring the session. The session information may include information for transferring the session with the server device to a second user device. The device may receive a request to transfer the session from the second user device. The device may send the session information to the second user device causing the session to be transferred from the first user device to the second user device. The device may establish the same session for communicating the data between the second user device and the server device.

20 Claims, 9 Drawing Sheets

SESSION TRANSFER PROTOCOL BETWEEN DIFFERENT BROWSERS ON DIFFERENT DEVICES

BACKGROUND

A user may use multiple user devices to view content on the Internet. For example, a user may browse the Internet using a mobile phone, a table computer, a desktop computer, etc. Each time a user uses one of these user devices, the device may establish a new session with a server via the Internet to exchange data with the server.

DETAILED DESCRIPTION OF PREFERRED EMBODIMENTS

The following detailed description of example implementations refers to the accompanying drawings. The same reference numbers in different drawings may identify the same or similar elements.

Rather than starting a new session each time a user uses a user device to browse the Internet, the user may want to continue a session from another user device. For example, a user watching a video from the Internet on a desktop computer may want to shift viewing of the content to another user device (e.g., a mobile phone, a tablet computer, etc.) and go to another location while continuing to watch the video. Moreover, the user may want to shift viewing of the content to the other user device without having to re-navigate the Internet to find the video and without having to re-input any security or login information that may be needed to access the video again.

Implementations described herein may seamlessly transfer a session from a first user device to a second user device. For example, a session between the first user device and a server device may be transferred to a second user device such that the second user device may communicate with the server device via the same session. Moreover, implementations described herein may permit a session to be transferred independent of the browser applications used on the first user device and the second user device. In other words, the first user device and the second user device may not need to use the same browser application to be able to transfer the session.

Figure 1A:
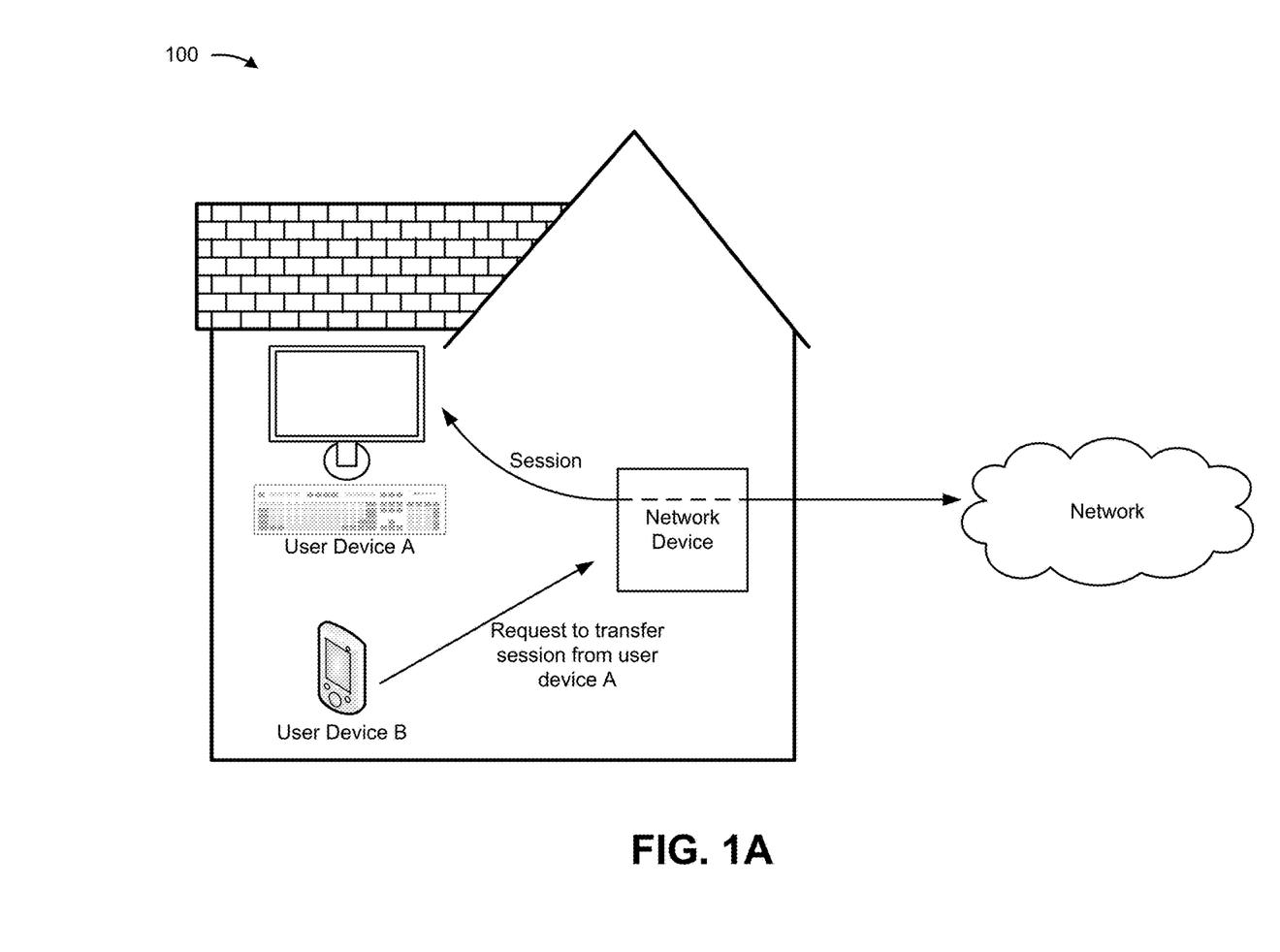
FIGS. 1A and 1B are diagrams of an overview of an example implementation described herein.
Figure 1B:
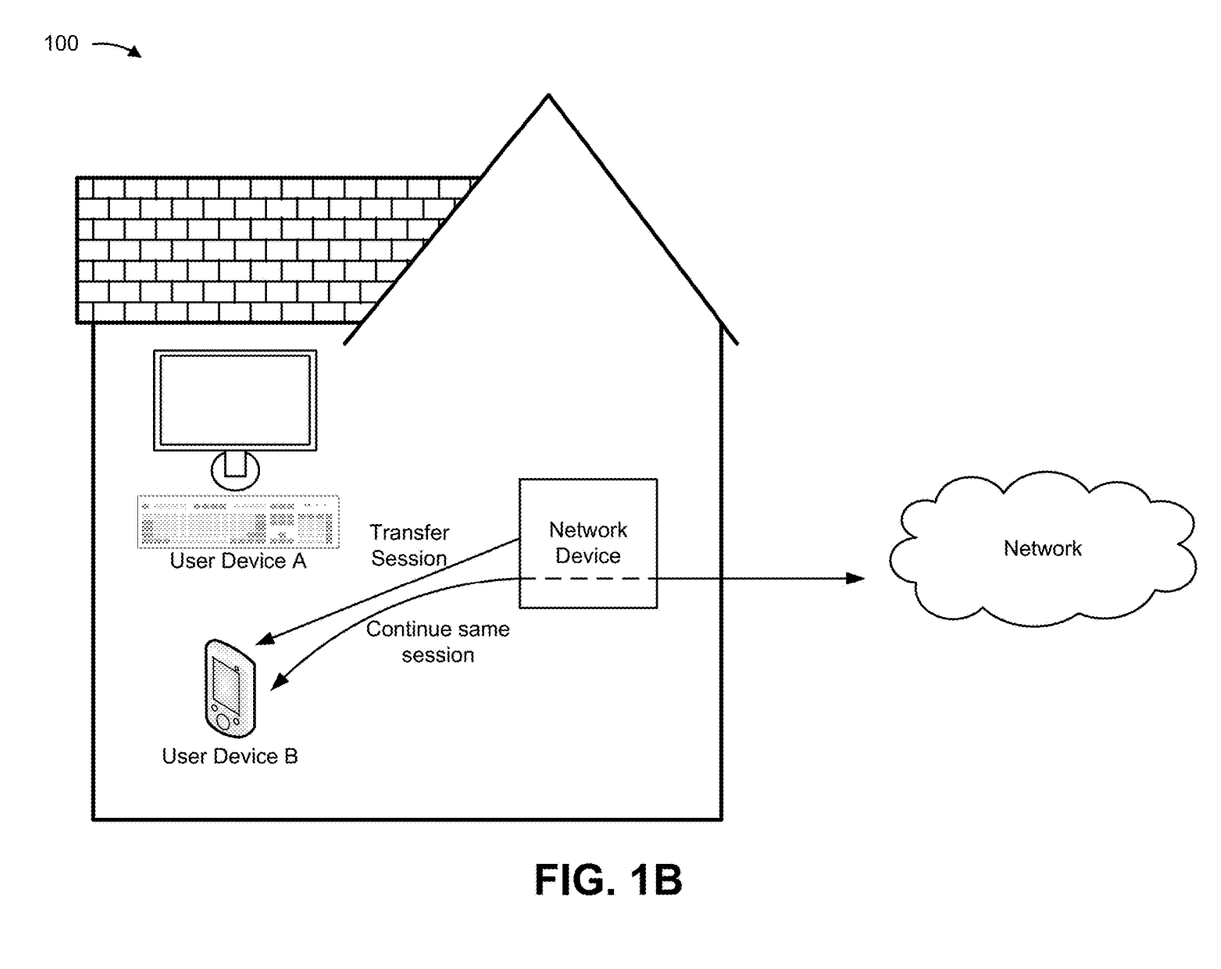

FIGS. 1A and 1B are diagrams of an overview of an example implementation 100 described herein. As shown in FIG. 1A, assume a user device A uses a browser application to establish a session for accessing content on a network via a network device. For example, the session may be between a server device on the network and user device A. The network device may be a router installed at a user's residence that user device A uses to connect to the network (e.g., the Internet). The network device may monitor the session and store session information for the session based on monitoring the session.

As further shown in FIG. 1A, assume a user device B is connected to the same network device. A user of user device B may open a browser application and request to have the session with user device A transferred to user device B.

As shown in FIG. 1B, the network device may transfer the session to user device B based on the request. For example, the network device may transfer the session by sending the session information for the session to user device B. User device B may use the session information to use the same session to communicate with the server device on the network to continue the session where the session left off on user device A.

In this way, the session may be seamlessly transferred from user device A to user device B independent of which browser applications are used. Moreover, the session, and content exchanged during the session, may be transferred to user device B without a user of user device B having to re-navigate to the particular webpage hosted by the server device and/or without having to re-input security information for accessing the content.

Figure 2:
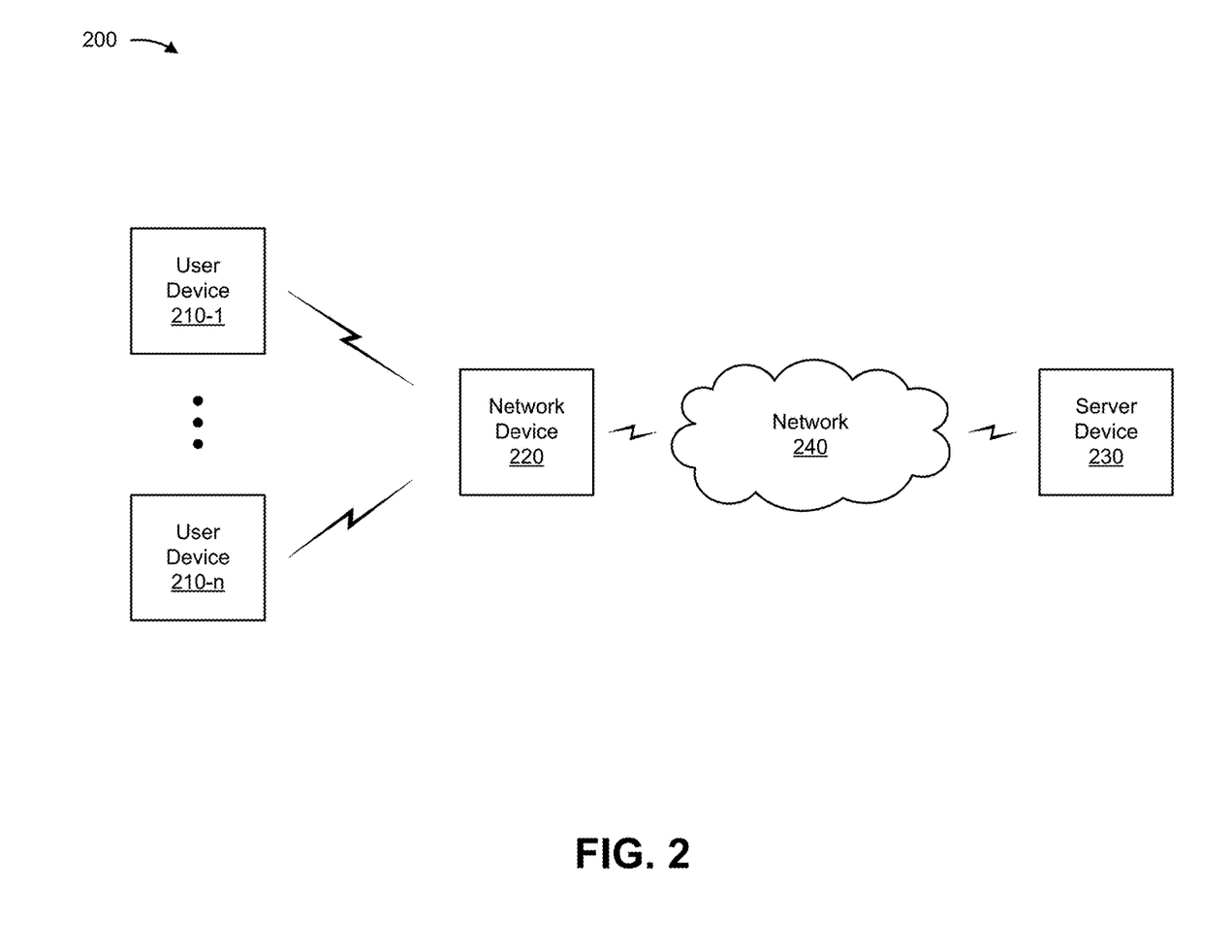
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210-1 through 210-*n* (n≥1) (hereinafter referred to collectively as "user devices 210," and individually as "user device 210"), a network device 220, a server device 230, and/or a network 240. Devices of environment 200 may interconnect via wired connections, wireless connections, or a combination of wired and wireless connections.

User device 210 may include a device capable of receiving, generating, storing, processing, and/or providing information. For example, user device 210 may include a device, such as a mobile phone (e.g., a smart phone, a radiotelephone, etc.), a laptop computer, a tablet computer, a desktop computer, a handheld computer, a gaming device, a set-top box, or a similar device. In some implementations, user device 210 may receive information from and/or transmit information to another device in environment 200.

Network device 220 may include one or more devices (e.g., one or more traffic transfer devices) capable of transferring traffic between devices via network 240. For example, network device 220 may include a firewall, a router, a gateway, a switch, a hub, a bridge, a reverse proxy, a server (e.g., a proxy server), a security device, an intrusion detection device, a load balancer, or a similar device. In some implementations, network device 220 may be used to connect user devices 210 to network 240.

Server device 230 may include one or more devices capable of storing, processing, and/or routing information. In some implementations, server device 230 may include a communication interface that allows server device 230 to receive information from and/or transmit information to other devices in environment 200.

Network 240 may include one or more wired and/or wireless networks. For example, network 240 may include a cellular network (e.g., an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber opticbased network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
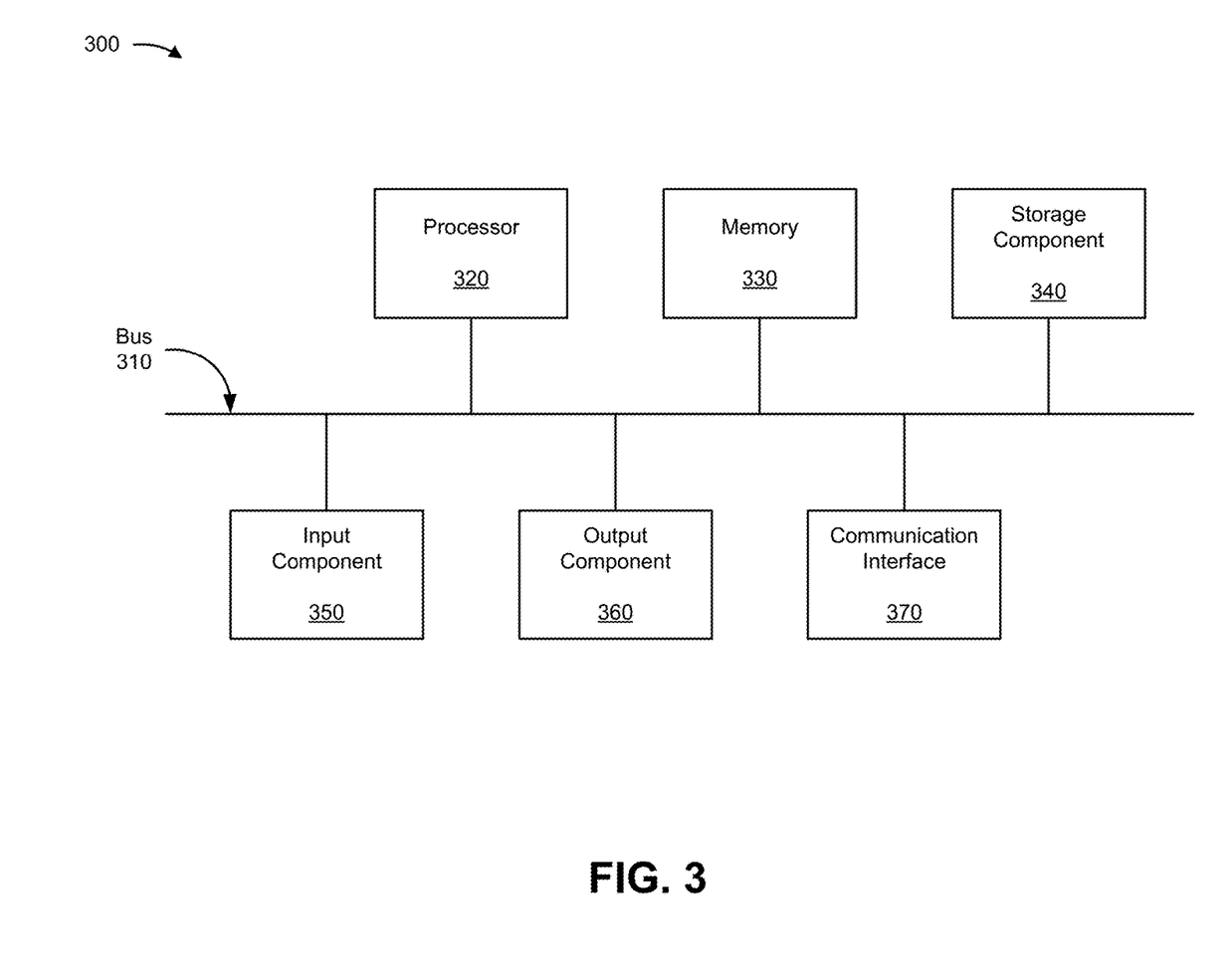
FIG. 3 is a diagram of example components of one or more devices of FIG. 2.

FIG. 3 is a diagram of example components of a device 300. Device 300 may correspond to user device 210, network device 220, and/or server device 230. In some implementations, user device 210, network device 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
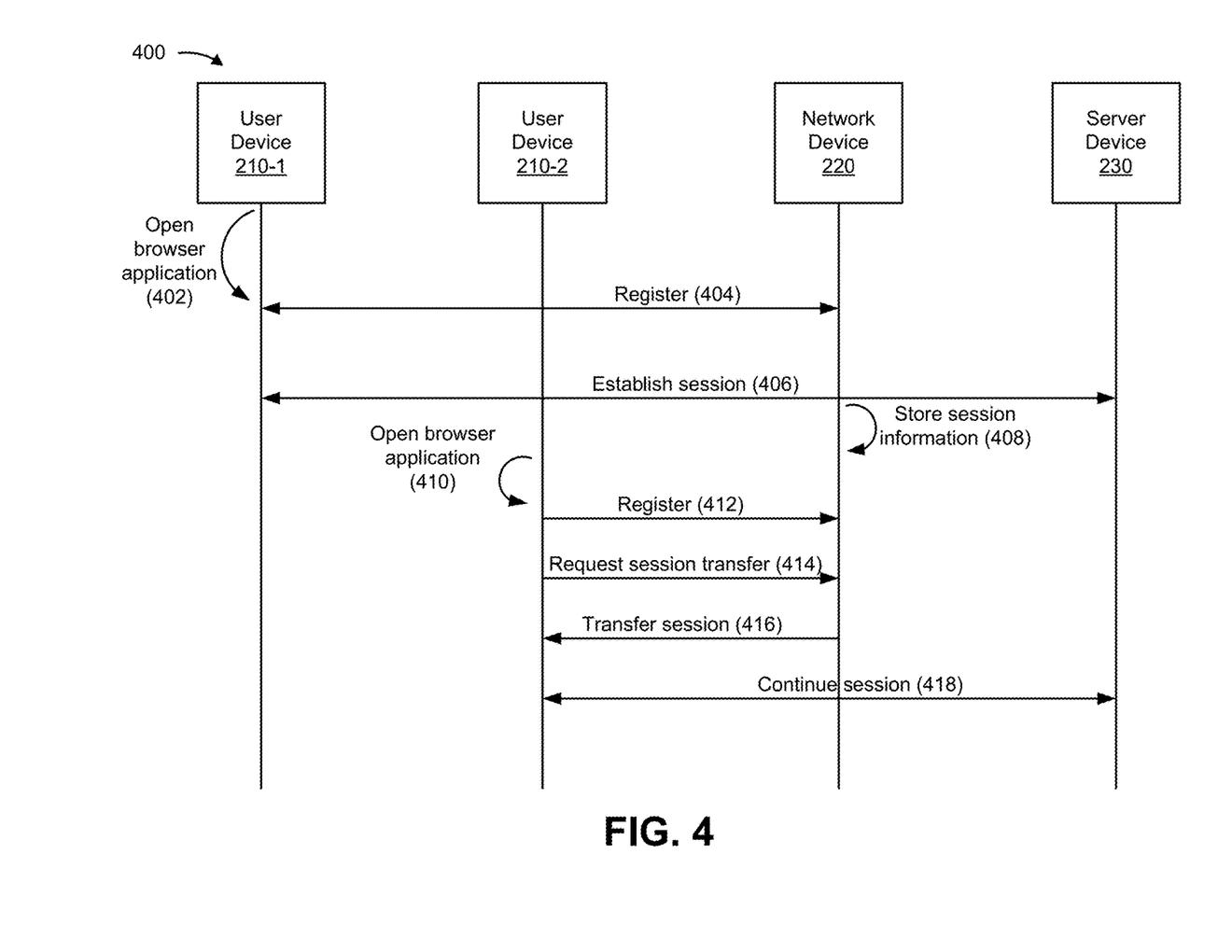
FIG. 4 is a call flow diagram of an example process for transferring a session between user devices.

FIG. 4 is a call flow diagram of an example process 400 for transferring a session between user devices 210. In some implementations, one or more process blocks of FIG. 4 may be performed by user device 210-1, user device 210-2, network device 220, and/or server device 230. Additionally, or alternatively, one or more process blocks of FIG. 4 may be performed by another device or a group of devices separate from or including user device 210-1, user device 210-2, network device 220, and/or server device 230, such as another user device 210 and/or another device.

As shown in FIG. 4, process 400 may include opening a browser application (block 402). For example, user device 210-1 may open a browser application.

The browser application may be an application for communicating data, via network 240, with server device 230, another user device 210, and/or another device. For example, the browser application may be an Internet browser, a mobile app for a particular function, or another application used to connect to network 240. The browser application may communicate with another device via a session established between user device 210-1 and the other device.

User device 210-1 may store the browser application in a memory included in or accessible by user device 210-1. A user of user device 210-1 may open the browser application by starting and/or executing the browser application installed on user device 210-1.

As further shown in FIG. 4, process 400 may include registering with network device 220 (block 404). For example, network device 220 may register the browser application executed by user device 210-1 based on the browser application being opened.

In some implementations, user device 210-1 may automatically send a register request to network device 220 based on the browser application being opened. Alternatively, user device 210-1 may send the register request to network device 220 based on user input. For example, the user may input a command and/or make a selection from a user interface provided by user device 210-1 (via the browser application and/or another application) to register the browser application executed by user device 210-1 with network device 220. User device 210-1 may send the register request to network device 220 based on the command and/or selection.

The register request may request that network device 220 register the browser application so that a session with user device 210-1 may be transferred to another user device 210. In some implementations, the register request may include browser information that identifies the browser and/or user device information that identifies user device 210-1 (e.g., the user device 210 that sends the register request). For example, the browser information may include a name of the browser application, a type of browser application, a version of the browser application, etc. Additionally, or alternatively, the user device information may indicate a name of user device 210-1 (e.g., a user specified name), a type of user device 210-1 (e.g., a phone, a desktop computer, a tablet computer, etc.), a make and/or model of user device 210-1, an Internet Protocol (IP) address of user device 210-1, etc. As will be explained in more detail later, the browser information and/or the user device information may be used by a user of the other user device 210 to identify user device 210-1 as a user device 210 from which to transfer a session. In some implementations, user device 210-1 may send the user device information to network device 220 when user device 210-1 establishes an initial connection with network device 220. For example, user device 210-1 may send the user device information to network device 220 before the browser is opened and/or the register request is sent to network device 220.

In some implementations, a user of user device 210-1 may input a passcode (e.g., a password, a personal identification number (PIN), etc.) into user device 210-1 that may be used to authenticate a transfer of a session. User device 210-1 may send the passcode to network device 220.

Additionally, or alternatively, a user may input login information (e.g., a username, a passcode, etc.) into user device 210-1 to log into an account set up with network device 220. The account may be associated with other accounts specified by the user to be authorized to receive a transfer of a session. For example, network device 220 may store an account data structure for each account indicating login information for the account associated with authorized accounts that are permitted to receive a transfer of a session from the account. In some implementations, the user may only sign into the account once on user device 210-1 and then user device 210-1 may automatically send the login information to network device 220 when user device 210-1 sends the register request to network device 220 (e.g., based on the browser application being opened).

Additionally, or alternatively, a user may input settings information into user device 210-1 when user device 210-1 is registered and/or when user device 210-1 sets up the account. The settings information may identify a particular kind of device (e.g., a tablet computer, a mobile phone, etc.) and/or a user device identifier for a particular user device 210 that is permitted to receive a transfer of a session from user device 210-1. In some implementations, the settings information may indicate a kind of session (e.g., a secure session, an unsecure session, a session requiring security information) and/or sessions with particular websites that are permitted to be transferred to other user devices 210.

The passcode, the login information, and/or the settings information input by the user may be referred to as authentication information herein.

Network device 220 may receive the register request and the authentication information. Network device 220 may register the browser application and/or user device 210-1 by creating an entry in a session data structure for the browser application and/or user device 210-1. Network device 220 may store the session data structure in a memory included in or accessible by network device 220. The entry in the session data structure may associate the browser information, a user device identifier of user device 210-1 (e.g., an IP address obtained from the user device information, a user device name, etc.), the authentication information, and/or session information for a session that may be established with user device 210-1 via network device 220.

As further shown in FIG. 4, process 400 may include establishing a session (block 406). For example, user device 210-1 and server device 230 may establish a session via network device 220.

User device 210-1 and server device 230 may communicate data via the session. In other words, user device 210-1 and server device 230 may exchange data via network device 220. For example, network device 220 may route data from user device 210-1 to server device 230 and/or from server device 230 to user device 210-1.

As further shown in FIG. 4, process 400 may include storing session information for the session (block 408). For example, network device 220 may store session information for the session.

Network device 220 may monitor the data communicated via the session while routing the data. For example, network device 220 may monitor the data via deep packet inspection of data routed through network device 220. The monitored data may include session information used to establish, transfer, and/or continue a session. For example, the session information may include Hyper Text Transfer Protocol (HTTP) cookies, security information (e.g., security information user device 210-1 uses to log into an account with server device 230), a server device identifier that identifies server device 230 (e.g., an IP address of server device 230, a port number, etc.), a website address and/or webpage address, a session identifier that identifies the session, and/or any other information about the session that will allow the session to be seamlessly transferred to another user device 210.

Network device 220 may inspect the data communicated via the session for session information and store a copy of the session information in the entry of the session data structure for the browser application and/or user device 210-1.

If user device 210-1 establishes a new session (e.g., with another server device 230), network device 220 may update the session information in the entry of the session data structure with session information for the new session. Accordingly, the entry in the session data structure for the session may store session information for an active session.

As shown in FIG. 4, process 400 may include opening a browser application (block 410). For example, user device 210-2 may open a browser application in a same way as described with respect to user device 210-1 opening a browser application at block 402.

The browser application that user device 210-2 opens may be the same kind or a different kind of browser application that user devices 210-1 opens.

As further shown in FIG. 4, process 400 may include registering with network device 220 (block 412). For example, network device 220 may register a browser application executed by user device 210-2 based on the browser application being opened in a same way as described with respect to the browser application executed by user device 210-1 being registered at block 404.

As further shown in FIG. 4, process 400 may include requesting a session be transferred from user device 210-1 to user device 210-2 (block 414). For example, user device 210-1 may request a session be transferred from user device 210-1 to user device 210-2.

Network device 220 may send selection information identifying registered user devices 210, registered browser applications, and/or sessions to user device 210-2. In some implementations, network device 220 may automatically send the selection information based on registering the browser application executed by user device 210-2. Alternatively, a user of user device 210-2 may input a command or make a selection from a user interface provided by user device 210-2 that requests the selection information. User device 210-2 may send a request for the selection information to network device 220. Network device 220 may receive the request and send the selection information to user device 210-2 based on the request. The selection information may include browser identifiers and/or user device identifiers for user devices 210 with active and/or registered sessions (e.g., a browser name, a browser type, a user device name, a user device type, a user device make and/or model, etc.) and/or information about the session (e.g., a website or webpage being visited via the session).

User device 210-2 may receive the selection information and present the selection information to a user via a user interface. For example, user device 210-2 may display a list of browser applications and/or user devices 210 from which a session may be transferred. Additionally, or alternatively, user device 210-2 may display a list of sessions active for a user device 210 if a user device 210 has more than one active session. A user of user device 210-2 may select a browser application, a user device 210, and/or session from which to transfer the session. In some implementations, user device 210-2 may select more than one session to transfer. For example, user device 210-2 may select more than one session from a single user device 210 to transfer and/or select a session from each of multiple user devices 210. Assume that the selection information identifies user device 210-1 and that the user selects to transfer the session from user device 210-1 in process 400. User device 210-2 may send a transfer request to network device 220 based on the selection. The transfer request may request that the session for user device 210-2 be transferred to user device 210-1.

Network device 220 may receive the transfer request and identify the session to be transferred based on the transfer request and an entry in the session data structure for the session.

In some implementations, the session may be associated with authentication information. For example, the user of user device 210-1 may have set a passcode for transferring the session to another device, which is stored in the entry for the session in the session data structure. In such a case, network device 220 may send an authentication request to user device 210-2 asking the user of user device 210-2 to input the passcode. User device 210-2 may receive the authentication request and prompt the user to input the passcode based on the authentication request. The user may input the passcode and user device 210-2 may send the passcode to network device 220. Network device 220 may receive the passcode and compare the passcode received from user device 210-2 to the passcode set by user device 210-1. If the passcodes match, network device 220 may permit transfer of the session. On the other hand, if the passcodes do not match, network device 220 may prevent transfer of the session to user device 210-2.

Additionally, or alternatively, user device 210-1 and user device 210-2 may have sent login information to log into account(s) setup with user device 210-1. In such a case, network device 220 may identify a first account associated with the login information received from user device 210-1 and identify a second account associated with the login information received from user device 210-2. Network device 220 may look up the first account in the account data structure and obtain information identifying authorized accounts permitted to receive a transfer of a session. If the second account (e.g., the account logged into at user device 210-2) matches an authorized account and/or is the same as the first account (e.g., the same account was logged into on user device 210-1 and user device 210-2), then network device 220 may permit transfer of the session to user device 210-2. On the other hand, if the second account does not match an authorized account or is not the same as the first account, then network device 220 may prevent transfer of the session to user device 210-2.

Additionally, or alternatively, network device 220 may send user device 210-1 a notification that user device 210-2 has requested to transfer the session. User device 210-1 may present the notification and a user of user device 210-1 may input a command to permit a transfer of the session or to prevent a transfer of the session. User device 210-1 may send the command to network device 220 and network device 220 may receive the command. If the command indicates that a transfer of the session is permitted, network device 220 may permit transfer of the session to user device 210-2. On the other hand, if the command indicates that a transfer of the session should be prevented, then network device 220 may prevent a transfer of the session to user device 210-2.

As further shown in FIG. 4, process 400 may include transferring the session to user device 210-2 (block 416). For example, network device 220 may transfer the session to user device 210-2.

Network device 220 may transfer the session by sending the session information, included in the session data structure, for the session with user device 210-1 to user device 210-2. Network device 220 may update the session data structure such that the session information is associated with user device 210-2 and/or authentication information received from user device 210-2.

In some implementations, rather than monitoring the session and storing session information obtained by monitoring the session, network device 220 may request that user device 210-1 provide the session information to network device 220 based on network device 220 receiving the request to transfer the session. For example, network device 220 may send a request for the session information to user device 210-1. User device 210-1 may receive the request and send the session information to network device 220. Network device 220 may receive the session information from user device 210-1.

In some implementations, network device 220 may send the session information to user device 210-2 based on the transfer of the session being permitted. On the other hand, network device 220 may prevent the session information from being sent to user device 210-2 based on the transfer of the session being prevented.

As further shown in FIG. 4, process 400 may include continuing the session (block 418). For example, user device 210-2 may continue the session with server device 230.

User device 210-2 may receive the session information from network device 220. The browser application may use the session information to communicate with service device 230 and establish the session with server device 230. Thus, user device 210-2 may continue the session that was previously between user device 210-1 and server device 230, and exchange data with service device 230 via the session. In some implementations, the session between user device 210-1 and server device 230 may be terminated based on the session being transferred to user device 210-2.

Accordingly, the session may be seamlessly transferred from user device 210-1 to user device 210-2. For example, user device 210-2 may resume the session previously between user device 210-1 and server device 230 without a user having to input a web address, security information, and/or any other information used by user device 210-1 to originally establish the session. In other words, a user of user device 210-2 will be able to pick up the session right where the user of user device 210-1 left off. Moreover, in some implementations, transfer of the session between user device 210-1 and user device 210-2 is not dependent on user device 210-1 and user device 210-2 using a same browser application and the session may be transferred between different browser applications.

In some implementations, a user of user device 210-1 may input a command into user device 210-1 to enter a private mode on the browser application. Network device 220 may detect that the browser application is in the private mode. For example, user device 210-1 may send a message to network device 220 that the browser application is in a private mode. When the browser application is in the private mode, network device 220 may not transfer the session to another user device 210 (e.g., user device 210-2). For example, user device 210-1 may not send the register request to network device 220 (e.g., at block 404) if the browser is opened in the private mode. If the private mode is entered during an established session (e.g., after the register request is sent), then network device may stop storing session information for the session (e.g., at block 408) and/or deregister user device 210-1 by deleting the entry for the session in the session data structure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
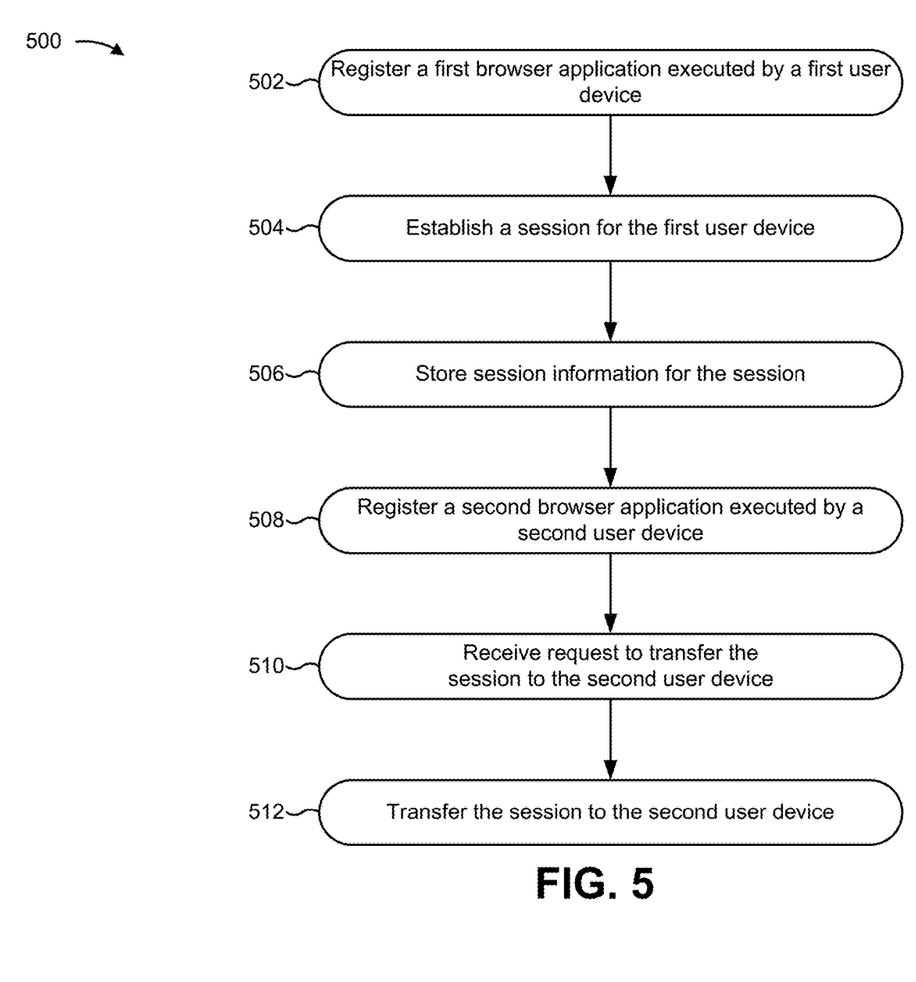
FIG. 5 is a flow chart of an example process relating to the call flow diagram shown in FIG. 4.

FIG. 5 is a flow chart of an example process 500 relating to the call flow diagram shown in FIG. 4. In some implementations, one or more process blocks of FIG. 5 may be performed by network device 220. Additionally, or alternatively, one or more process blocks of FIG. 5 may be performed by another device or a group of devices separate from or including network device 220, such as user device 210 and/or server device 230.

As shown in FIG. 5, process 500 may include registering a first browser application executed by a first user device (block 502). For example, network device 220 may register the first browser application executed by user device 210-1 as described with respect to block 404 in FIG. 4.

As further shown in FIG. 5, process 500 may include establishing a session for the first user device (block 504). For example, network device 220 may establish a session between user device 210-1 and server device 230 as described with respect to block 406 in FIG. 4.

As further shown in FIG. 5, process 500 may include storing session information for the session (block 506). For example, network device 220 may store session information for the session as described with respect to block 408 in FIG. 4.

As further shown in FIG. 5, process 500 may include registering a second browser application executed by a second user device (block 508). For example, network device 220 may register a second browser application executed by user device 210-2 as described with respect to block 412 in FIG. 4.

As further shown in FIG. 5, process 500 may include receiving a request to transfer the session to the second user device (block 510). For example, network device 220 may receive the request to transfer the session to the user device 210-2 as described with respect to block 414 in FIG. 4.

As further shown in FIG. 5, process 500 may include transferring the session to the second user device (block 512). For example, network device 220 may transfer the session to user device 210-2 and cause user device 210-2 to continue the session with server device 230 as described with respect to blocks 416 and 418 in FIG. 4.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
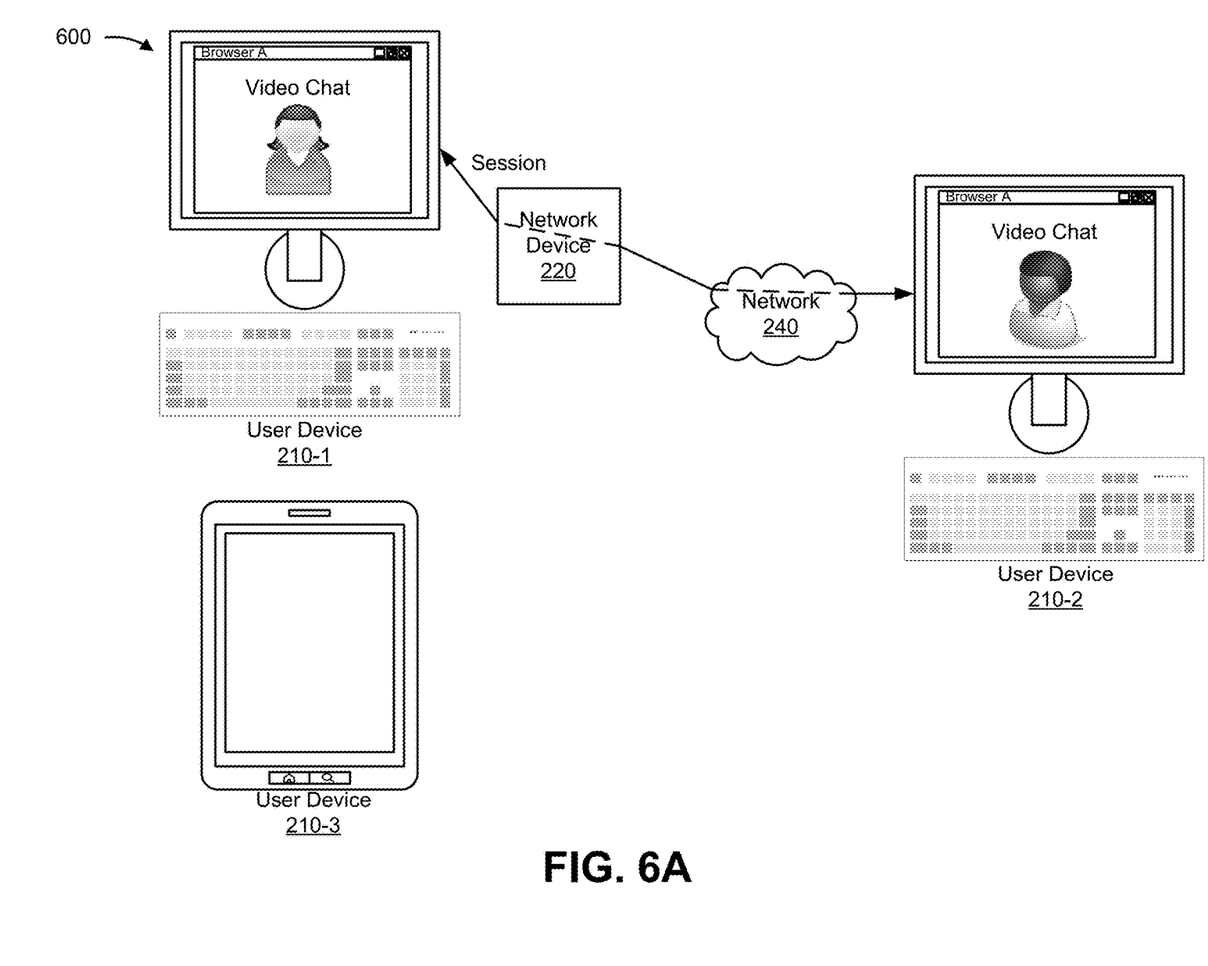
FIGS. 6A-6C are diagrams of an example implementation relating to the example processes shown in FIGS. 4 and 5.
Figure 6B:
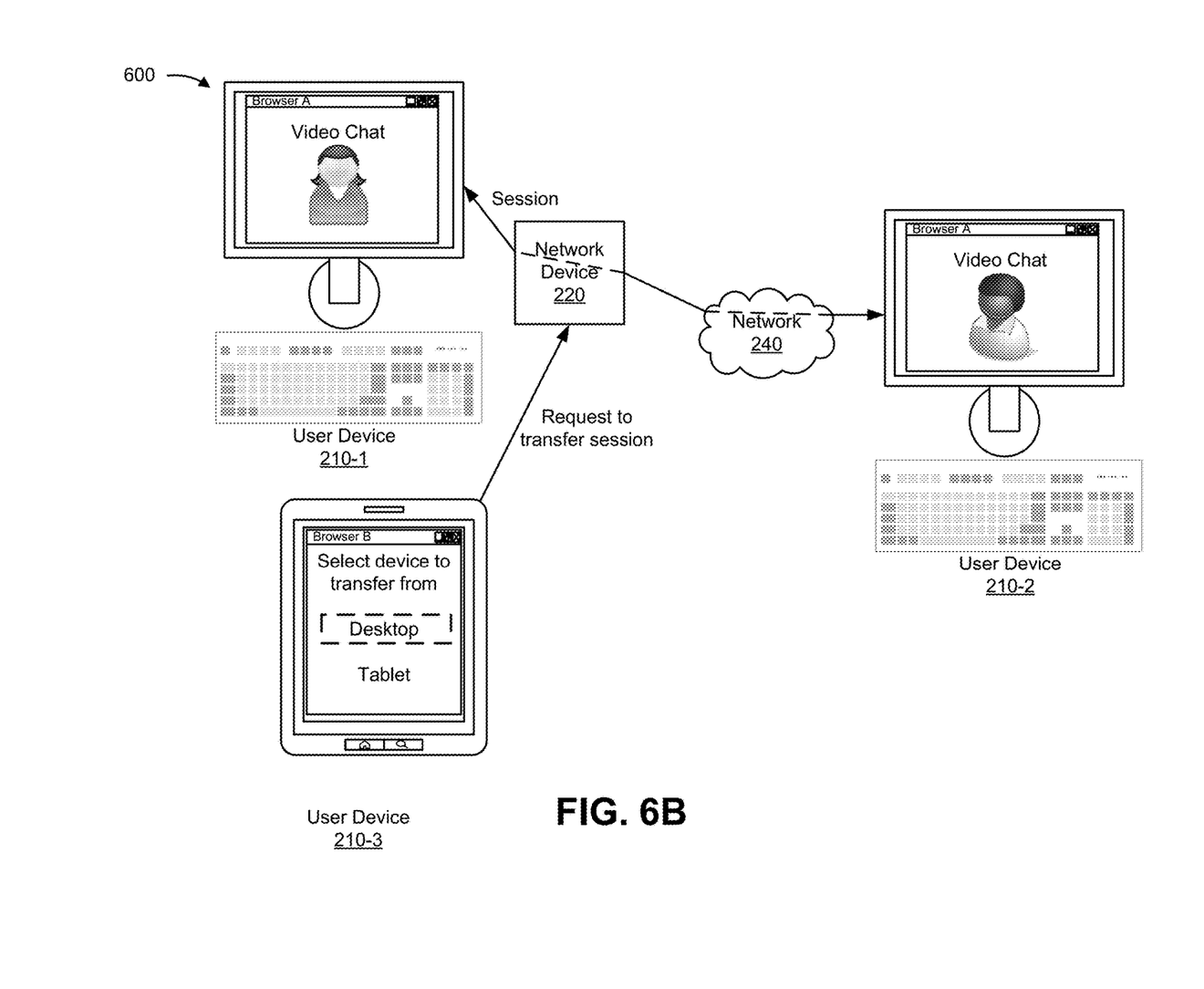
Figure 6C:
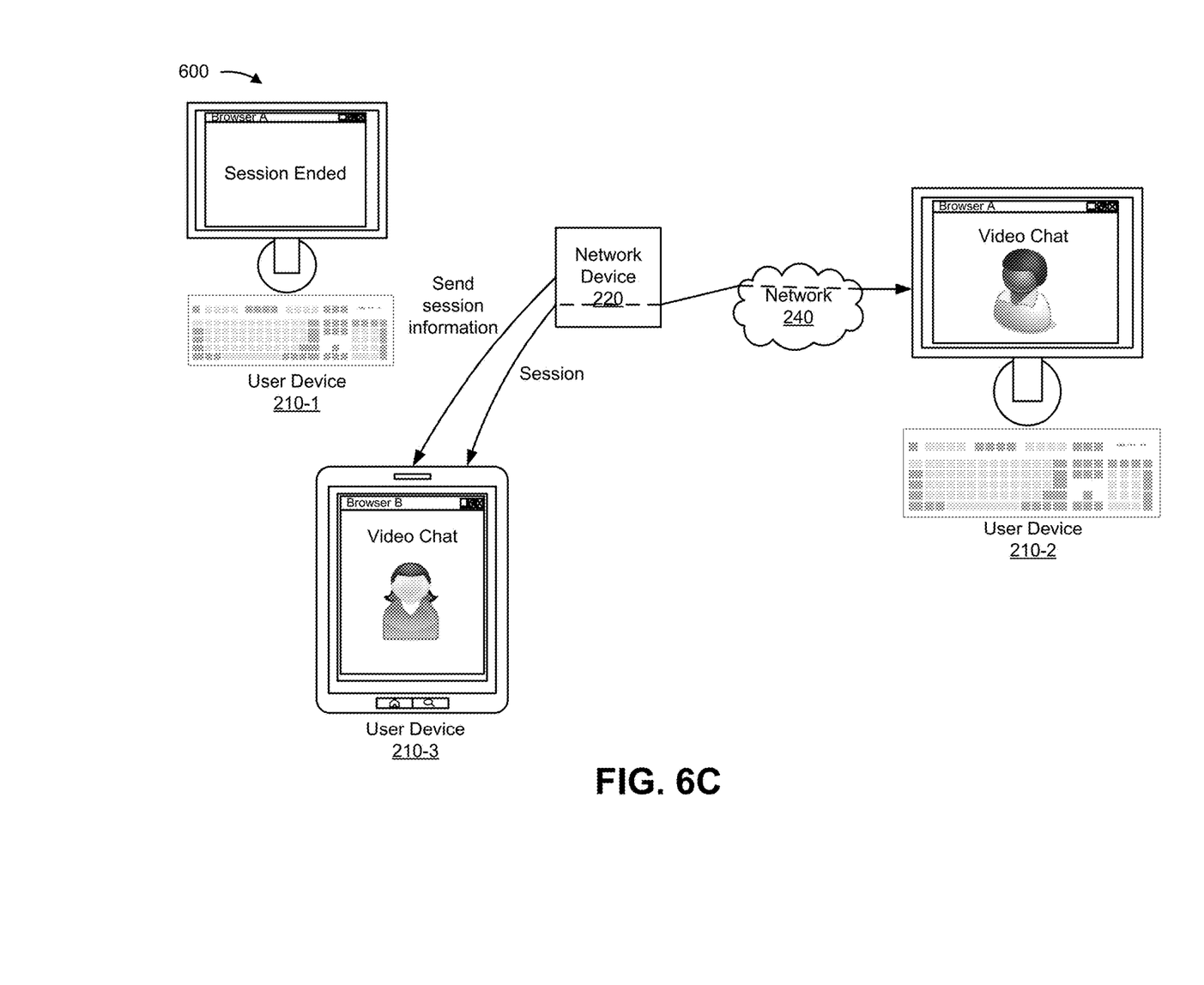

FIGS. 6A-6C are diagrams of an example implementation 600 relating to example processes 400 and 500 shown in FIGS. 4 and 5. FIGS. 6A-6C show an example of transferring a session between user devices 210.

In FIG. 6A, assume a user opens a web browser A (e.g., a browser application) on user device 210-1 (e.g., a desktop computer). User device 210-1 may automatically register web browser A with network device 220 based on web browser A being opened. Network device 220 may be a router inside the user's home. Network device 220 may create an entry for web browser A and/or user device 210-1 in a session data structure based on user device 210-1 registering web browser A.

As shown in FIG. 6A, the user of user device 210-1 may establish a session for a video chat with another user device 210-2 via network 240, and via a server device 230 (not shown) on network 240. For example, the user of user device 210-1 may navigate to a video chat website, enter security information to log into a video chat account, find a video chat partner (e.g., a user of user device 210-2), and start a new video chat.

Network device 220 may monitor data communicated via the session and store session information for the session based on monitoring the data. For example, the session information may include HTTP cookies for the video chat, the security information the user used to log into the video chat account, a device identifier that identifies server device 230 and/or user device 210-2 (e.g., an IP address), a website address and/or webpage address for the video chat, and/or a session identifier that identifies the session.

In FIG. 6B, assume a user device 210-3 (e.g., a mobile phone) opens a web browser B on user device 210-3. User device 210-3 may automatically register web browser B with network device 220 based on web browser B being opened. Further, assume a user of user device 210-3 selects an option to have a session transferred to user device 210-3 from a user interface provided by user device 210-3. User device 210-3 may request a list of active sessions from network device 220 based on the selection and network device 220 may send the list of active sessions to user device 210-3. The list of active sessions may indicate user devices 210 that are registered with network device 220 and have an active session. Assume user device 210-1 (e.g., "desktop") and another user device 210 (e.g., "tablet") (not shown) have active sessions with network device 220.

As shown in FIG. 6B, user device 210-3 may display a list of user devices 210 and/or web browsers that have an active session that may be transferred to user device 210-3. For example, user device 210-3 may display "desktop" and "tablet" to indicate that these devices both have an active session that may be transferred. Assume the user selects "desktop," and thus wants to transfer the session from user device 210-1. User device 210-3 may send a request to transfer the session from user device 210-1 to network device 220. Network device 220 may receive the request and determine that the session may be transferred to user device 210-3.

As shown in FIG. 6C, network device 220 may send the session information for the session to user device 210-3. User device 210-3 may receive the session information and use the session information to continue the session on user device 210-3. The video chat may be transferred seamlessly to user device 210-3 from user device 210-1 such that the video chat is not interrupted. Moreover, the user of user device 210-3 may continue the video chat without re-navigating to the video chat website, entering security information to log into a video chat account, finding the video chat partner (e.g., the user of user device 210-2), and establishing a new video chat.

As indicated above, FIGS. 6A-6C are provided merely as an example. Other examples are possible and may differ from what was described with regard to FIGS. 6A-6C.

Implementations described herein may seamlessly transfer a session from a first user device to a second user device. For example, a session between the first user device and a server device may be transferred to a second user device such that the second user device may communicate with the server device via the same session. Moreover, implementations described herein may permit a session be transferred independent of the browser applications used on the first user device and the second user device. In other words, the first user device and the second user device may not need to use the same browser application to be able to transfer the session.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A router device, comprising:
   a memory; and
   one or more processors to:
   establish a session for communicating data between a first user device and a server device;
   monitor the data communicated via the session while routing the data between the first user device and the server device;
   store session information based on monitoring the session;

the session information including information for
transferring the session with the server device to a
second user device;
register the second user device by creating an entry for
the session in a session data structure;
receive, from the second user device, a request to
transfer the session;
send, based on the request, the session information to
the second user device causing the session to be
transferred from the first user device to the second
user device;
establish the session for communicating the data
between the second user device and the server
device;
detect the second user device is in a private mode; and
prevent the session, while the session is active and the
router device is routing the data between the second
user device and the server device, from being transferred from the second user device based on the
second user device being in the private mode,
where the one or more processors, when preventing
the session from being transferred, are to:
stop storing new session information for the session, and
deregister the second user device by deleting the
entry for the session in the session data structure
based on the second user device being detected
to be in the private mode.

2. The router device of claim 1, where the one or more processors are further to:
register a browser application based on the browser application being opened by the first user device; and
where the one or more processors, when monitoring the data communicated via the session, are to:
monitor the data communicated via the session based on registering the browser application.

3. The router device of claim 1, where the one or more processors, when monitoring the data communicated via the session, are to:
inspect the data communicated via the session for session information using deep packet inspection.

4. The router device of claim 1, where the one or more processors, when establishing the session for communicating the data between the first user device and the server device, are to:
establish the session between the first user device, executing a first browser application, and the server device; and
where the one or more processors, when establishing the session for communicating the data between the second user device and the server device, are to:
establish the session between the second user device, executing a second browser application, and the server device,
the first browser application being different than the second browser application.

5. The router device of claim 1, where the session information includes Hyper Text Transfer Protocol (HTTP) cookies, a server device identifier that identifies the server device, and a session identifier that identifies the session.

6. The router device of claim 1, where the one or more processors are further to:
establish a plurality of sessions for a plurality of user devices,
the plurality of sessions including the session,
the plurality of user devices including the first user device,
send selection information identifying at least one of the plurality of sessions or the plurality of user devices to the second user device; and
where the one or more processors, when receiving the request to transfer the session from the second user device, are to:
receive the request to transfer the session based on the selection information.

7. The router device of claim 1, where the one or more processors, when establishing the session for communicating the data between the second user device and the server device, are to:
establish the session for communicating the data between the second user device and the server device without interrupting the session.

8. The router device of claim 1, where the second user device is in the private mode based on a selection within a browser application; and
where the one or more processors, when detecting that the second user device is in the private mode, are further to:
detect that the second user device is in the private mode based on the selection within the browser application.

9. A non-transitory computer-readable medium storing instructions, the instructions comprising:
one or more instructions that, when executed by one or more processors of a router device, cause the one or more processors to:
transfer data for a session between a first user device and a server device;
monitor the data transferred via the session while routing the data between the first user device and the server device;
store session information based on monitoring the session;
the session information including information for transferring the session with the server device to a second user device;
register the second user device by creating an entry for the session in a session data structure;
receive a request to transfer the session to the second user device;
send the session information to the second user device based on the request,
the session information causing the session to be transferred from the first user device to the second user device;
transfer the data for the session between the second user device and the server device;
detect the second user device is in a private mode; and
prevent the session, while the session is active and the router device is routing the data between the second user device and the server device, from being transferred from the second user device based on the second user device being in the private mode,
where the one or more instructions, that cause the one or more processors to prevent the session from being transferred, cause the one or more processors to:
stop storing new session information for the session, and
deregister the second user device by deleting the entry for the session in the session data structure based on the second user device being detected to be in the private mode.

10. The non-transitory computer-readable medium of claim 9, where the one or more instructions, when executed by the one or more processors, further cause the one or more processors to:
receive authentication information from the first user device; and
where the one or more instructions, that cause the one or more processors to send the session information to the second user device, cause the one or more processors to:
send the session information to the second user device based on the authentication information.

11. The non-transitory computer-readable medium of claim 9, where the one or more instructions, when executed by the one or more processors, further cause the one or more processors to:
receive a first passcode from the first user device;
receive a second passcode from the second user device; and
determine the first passcode matches the second passcode, where the one or more instructions, that cause the one or more processors to send the session information to the second user device, cause the one or more processors to:
send the session information to the second user device based on the first passcode matching the second passcode.

12. The non-transitory computer-readable medium of claim 9, where the one or more instructions, when executed by the one or more processors, further cause the one or more processors to:
receive first login information from the first user device;
identify a first account based on the first login information;
identify an authorized account, associated with the first account, to which the session is permitted to be transferred;
receive second login information from the second user device;
identify a second account based on the second login information;
determine the second account matches the authorized account; and
where the one or more instructions, that cause the one or more processors to send the session information to the second user device, cause the one or more processors to:
send the session information to the second user device based on the second account matching the authorized account.

13. The non-transitory computer-readable medium of claim 9, where the one or more instructions, when executed by the one or more processors, further cause the one or more processors to:
send a notification to the first user device based on receiving the request to transfer the session to the second user device,
the notification requesting a user of the first user device to authorize a transfer of the session to the second user device;
receive a response from the first user device, based on the notification, indicating authorization to transfer of the session; and
where the one or more instructions, that cause the one or more processors to send the session information to the second user device, cause the one or more processors to:
send the session information to the second user device based on the response.

14. The non-transitory computer-readable medium of claim 9, where the one or more instructions, when executed by the one or more processors, further cause the one or more processors to:
register a first browser application executed by the first user device;
register a second browser application executed by the second user device; and
where the one or more instructions, that cause the one or more processors to send the session information to the second user device, cause the one or more processors to:
send the session information to the second user device based on registering the first browser application and registering the second browser application.

15. A method, comprising:
establishing, by a router device, a session for communicating data between a first user device and a server device;
inspecting, by the router device, the data communicated via the session while routing the data between the first user device and the server device;
storing, by the router device, session information based on inspecting the data communicated via the session;
the session information including information for transferring the session with the server device to a second user device;
registering, by the router device, the second user device by creating an entry for the session in a session data structure;
receiving, by the router device, a request to transfer the session to the second user device;
sending, by the router device, the session information to the second user device based on the request;
establishing, by the router device, the session for communicating the data between the second user device and the server device;
detecting, by the router device, that the second user device is in a private mode; and
preventing, by the router device, the session from being transferred from the second user device based on the second user device being in the private mode,
where preventing the session from being transferred comprises:
stopping storing new session information for the session, and
deregistering the second user device by deleting the entry for the session in the session data structure based on the second user device being detected to be in the private mode.

16. The method of claim 15, where establishing the session for communicating the data between the second user device and the server device comprises:
continuing a same session established between the first user device and the server device.

17. The method of claim 15, further comprising:
terminating the session between the first user device and the server device based on establishing the session between the second user device and the server device.

18. The method of claim 15, where the first user device and the second user device use different browser applications to communicate with the server device via the session.

19. The method of claim 15, further comprising:
receiving first authentication information from the first user device;

receiving second authentication information from the second user device; and where sending the session information to the second user device comprises:

sending the session information based on the first authentication information and the second authentication information.

20. The method of claim 15, where the second user device is in the private mode based on a selection within a browser application; and where detecting that the second user device is in the private mode includes:

detecting that the second user device is in the private mode based on the selection within the browser application.

* * * * *